(12) United States Patent
Buzzard et al.

(10) Patent No.: US 11,855,301 B2
(45) Date of Patent: Dec. 26, 2023

(54) SYSTEMS AND METHODS FOR BATTERY VENTILATION

(71) Applicant: Hamilton Sundstrand Corporation, Charlotte, NC (US)

(72) Inventors: John N. Buzzard, Rockford, IL (US); Chase Whitman, Baton Rouge, LA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 12 days.

(21) Appl. No.: 17/038,694

(22) Filed: Sep. 30, 2020

(65) Prior Publication Data

US 2021/0098763 A1  Apr. 1, 2021

Related U.S. Application Data

(60) Provisional application No. 62/908,400, filed on Sep. 30, 2019.

(51) Int. Cl.
*H01M 50/30* (2021.01)
*H01M 10/48* (2006.01)
(Continued)

(52) U.S. Cl.
CPC ........... *H01M 50/30* (2021.01); *H01M 10/48* (2013.01); *H01M 10/6567* (2015.04); *H01M 10/663* (2015.04); *H01M 50/20* (2021.01)

(58) Field of Classification Search
None
See application file for complete search history.

(56) References Cited

U.S. PATENT DOCUMENTS

| 4,468,440 A | * | 8/1984 | Evjen | ................... H01M 10/613 |
| | | | | 429/8 |
| 10,035,604 B2 | | 7/2018 | Bak et al. | |

(Continued)

FOREIGN PATENT DOCUMENTS

| CN | 202737006 U | 2/2013 |
| CN | 103779632 A | 5/2014 |

(Continued)

OTHER PUBLICATIONS https://avt.inl.gov/sites/default/files/pdf/fsev/power.pdf (Year: 2016).*

(Continued)

*Primary Examiner* — Lisa S Park
(74) *Attorney, Agent, or Firm* — Locke Lord LLP; Joshua L. Jones; Gabriella D'Angelo

(57) ABSTRACT

An electrical storage system includes an electric storage zone, an electric storage positioned within the electric storage zone, a cooling fluid source in fluid communication with the electric storage zone via a fluid flow path, a modulating valve in the fluid flow path downstream from the cooling fluid source and upstream from the electric storage zone, and a detector in fluid communication with the electric storage zone. A method for operating an electrical storage system includes adjusting a modulating valve in a fluid flow path to reduce a cooling airflow to an electric storage zone, operating a detector in fluid communication with the electric storage zone configured and adapted to sense at least one of smoke, gas, or other particulates during a detection period with a detection system, and adjusting the modulating valve to increase the cooling airflow to the electric storage zone.

11 Claims, 3 Drawing Sheets

(51) Int. Cl.
*H01M 10/6567* (2014.01)
*H01M 10/663* (2014.01)
*H01M 50/20* (2021.01)

(56) References Cited

U.S. PATENT DOCUMENTS

| | | | |
|---|---|---|---|
| 10,153,636 B1 | 12/2018 | Vander Lind et al. | |
| 10,177,424 B1 | 1/2019 | Melack et al. | |
| 2005/0178539 A1* | 8/2005 | Rotta | B64D 45/00 |
| | | | 165/235 |
| 2006/0273596 A1 | 12/2006 | Durbin | |
| 2008/0011900 A1 | 1/2008 | Quintana | |
| 2008/0121755 A1 | 5/2008 | Bennett | |
| 2008/0184906 A1 | 8/2008 | Kejha | |
| 2009/0139781 A1 | 6/2009 | Straubel | |
| 2009/0145998 A1 | 6/2009 | Salyer | |
| 2009/0283343 A1 | 11/2009 | Wurth | |
| 2010/0122864 A1 | 5/2010 | Rosman | |
| 2011/0024555 A1 | 2/2011 | Kuhn, Jr. | |
| 2011/0027632 A1* | 2/2011 | Higashino | H01M 10/613 |
| | | | 429/83 |
| 2011/0187119 A1 | 8/2011 | McMaster | |
| 2012/0019008 A1 | 1/2012 | Hughley | |
| 2013/0009469 A1 | 1/2013 | Gillett | |
| 2013/0049364 A1 | 2/2013 | Teets et al. | |
| 2014/0014424 A1 | 1/2014 | Boncodin | |
| 2014/0345281 A1 | 11/2014 | Galbraith | |
| 2014/0346283 A1 | 11/2014 | Salyer | |
| 2015/0311755 A1 | 10/2015 | Hiebl et al. | |
| 2016/0229532 A1 | 8/2016 | Shapery | |
| 2017/0085090 A1 | 3/2017 | Marzouk et al. | |
| 2017/0256831 A1 | 9/2017 | Hong et al. | |
| 2018/0048037 A1* | 2/2018 | Newman | H01M 10/63 |
| 2018/0112648 A1 | 4/2018 | Bond | |
| 2018/0212288 A1* | 7/2018 | Grace | H01M 10/425 |
| 2018/0237146 A1 | 8/2018 | Bak et al. | |
| 2018/0244386 A1 | 8/2018 | Phan | |
| 2019/0001804 A1 | 1/2019 | Wilhide | |
| 2019/0004580 A1 | 1/2019 | Wilhide | |

FOREIGN PATENT DOCUMENTS

| | | |
|---|---|---|
| CN | 206163652 U | 5/2017 |
| CN | 208862127 U | 5/2019 |
| EP | 3305653 A1 | 4/2018 |
| EP | 3328675 A1 | 6/2018 |
| JP | 2011006041 A | 1/2011 |
| JP | 2011065805 A | 3/2011 |
| JP | 2012056558 A | 3/2012 |
| JP | 2013193533 A | 9/2013 |
| JP | 2014227140 A | 12/2014 |
| JP | 2015137092 A | 7/2015 |
| JP | 6213494 B2 | 10/2017 |
| KR | 20080005377 U | 11/2008 |
| KR | 20110087661 A | 8/2011 |
| KR | 20110104405 A | 9/2011 |
| KR | 20130073244 A | 7/2013 |
| KR | 101343453 B1 | 12/2013 |
| KR | 101638964 B1 | 7/2016 |
| KR | 101667330 B1 | 10/2016 |
| KR | 20170010295 A | 1/2017 |
| KR | 20170097482 A | 8/2017 |
| KR | 101815287 B1 | 1/2018 |
| KR | 20180101555 A | 9/2018 |
| WO | 2010020199 A1 | 2/2010 |
| WO | 2015154545 A1 | 10/2015 |
| WO | 2015181512 A1 | 12/2015 |
| WO | 2016178770 A1 | 11/2016 |
| WO | 2017020987 | 2/2017 |

OTHER PUBLICATIONS

Extended European Search Reported dated Feb. 19, 2021 issued in corresponding European Application No. 20198617.1.

\* cited by examiner

SYSTEMS AND METHODS FOR BATTERY VENTILATION

CROSS-REFERENCE TO RELATED APPLICATIONS

This application claims priority to and the benefit of U.S. Provisional Application No. 62/908,400, filed Sep. 30, 2019, the entire contents of which are herein incorporated by reference in their entirety.

BACKGROUND

1. Field

The subject invention is directed to battery configurations in aircraft, and more particularly, to battery ventilation in hybrid-electric propulsion systems.

2. Description of Related Art

Aircraft engines vary in efficiency and function over a plurality of parameters, such as thrust requirements, air temperature, air speed, altitude, and the like. Aircraft require the most thrust at take-off, wherein the demand for engine power is the heaviest. However, during the remainder of the mission, the aircraft engines often do not require as much thrust as during take-off. The size and weight of the engines allows them to produce the power needed for take-off, however after take-off the engines are in effect over-sized for the relatively low power required to produce thrust for cruising in level flight.

The conventional techniques have been considered satisfactory for their intended purpose. However, there is an ever present need for improved aircraft engines. This disclosure provides a solution for this need.

SUMMARY

An electrical storage system includes an electric storage zone, an electric storage positioned within the electric storage zone, a cooling fluid source in fluid communication with the electric storage zone via a fluid flow path, a modulating valve in the fluid flow path downstream from the cooling fluid source and upstream from the electric storage zone, and a detector in fluid communication with the electric storage zone and configured and adapted to sense at least one of smoke, gas, or other particulates.

The electric storage zone can have a fluid inlet and a fluid outlet. The cooling fluid source can be in fluid communication with the fluid inlet. The detector can be in fluid communication with the fluid outlet downstream from the fluid outlet. The cooling fluid source can be upstream from the electric storage zone. A fluid exit flow path can extend from the electric storage zone. The electric storage can include a plurality of batteries. The electric storage can be electrically coupled to an electric motor controller. The electric motor controller can be electrically coupled to an electric motor. The detector can be included within a detector system operatively connected to the modulating valve to control fluid flow through the modulating valve.

In accordance with another aspect, a method for operating an electrical storage system includes adjusting a modulating valve in a fluid flow path to reduce a cooling airflow to an electric storage zone. The method includes operating a detector configured and adapted to sense at least one of smoke, gas, or other particulates during a detection period with a detection system. The detector is in fluid communication with the electric storage zone. The method includes adjusting the modulating valve to increase the cooling airflow to the electric storage zone.

A duration of the detection period can be a predetermined duration based on an estimated detection time. The cooling airflow can be being supplied from a cooling fluid source in fluid communication with the electric storage zone via the fluid flow path. The electric storage zone can include an electric storage. Adjusting the modulating valve can include adjusting the modulating valve with a detector system.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 2 is a schematic depiction of an embodiment of an electrical storage system in accordance with the present disclosure, showing the batteries, a cooling fluid source, and a detection system for smoke, gas, other particulates, or the like.

DETAILED DESCRIPTION OF THE PREFERRED EMBODIMENTS

Figure 1:
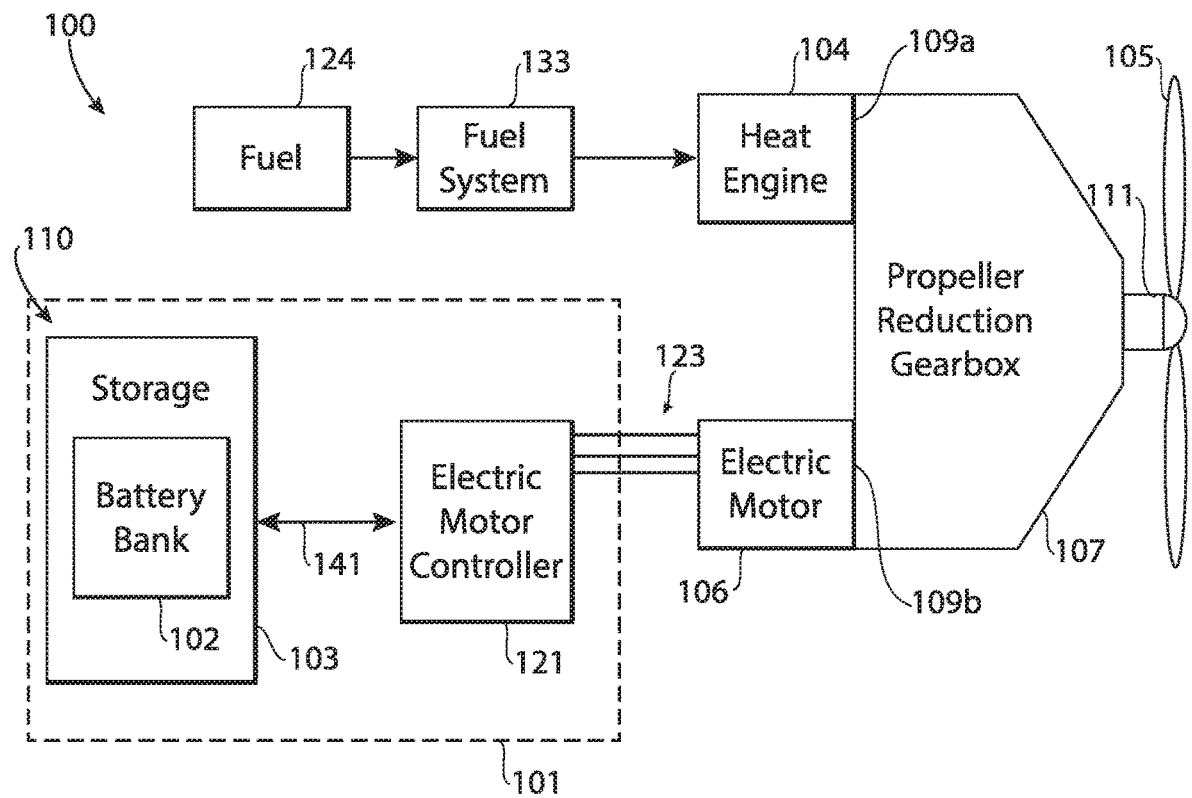
FIG. 1 is a schematic depiction of an embodiment of a hybrid electric propulsion system constructed in accordance with the present disclosure, showing an electric storage compartment.

Reference will now be made to the drawings wherein like reference numerals identify similar structural features or aspects of the subject disclosure. For purposes of explanation and illustration, and not limitation, an embodiment of a system in accordance with the disclosure is shown in FIG. 1 and is designated generally by reference character 100. Other embodiments of systems in accordance with the disclosure, or aspects thereof, are provided in FIGS. 2-3. System 100, electrical system 101, and electrical storage system 110, as will be described, facilitate hybrid-electric propulsion for an aircraft having smoke, gas and other particulate detection systems that provide improved detecting capabilities while still providing proper cooling and ventilation airflow for energy storage.

As shown in FIG. 1, a hybrid electric propulsion system 100 includes a heat engine 104, e.g. a thermal engine, and an electric motor 106, which on their own or together drive an air mover 105, e.g. a propeller, fan or the like, by way of a reduction gear box 107 and shaft 111. Reduction gear box 107 has an input 109a for heat engine 104 and an input 109b for electric motor 106. Those skilled in the art will also readily appreciate that a clutch can be disposed between reduction gear box 107 and the heat engine 104 and another clutch can be disposed between electric motor 106 and reduction gear box 107. Hybrid electric propulsion system 100 also includes liquid fuel tanks 124. It is contemplated that heat engine 104 could be a heat engine of any type, e.g., a gas turbine, spark ignited, diesel, rotary or reciprocating engine of any fuel type and with any configuration of turbomachiney elements, either turbocharger, turbosupercharger, supercharger and exhaust recovery turbo compounding, either mechanically, electrically, hydraulically or pneumatically driven.

Figure 2:
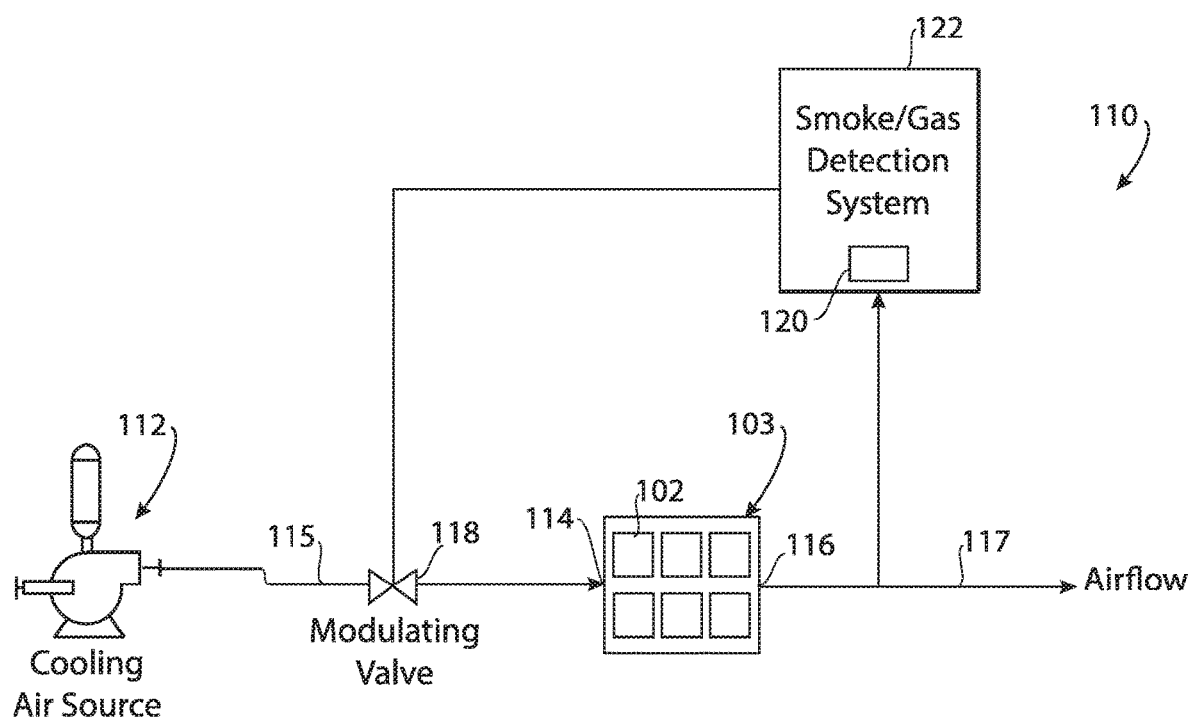

With continued reference to FIGS. 1-2, an electrical system 101 includes an electrical storage system 110 having an electric storage zone 103, e.g. a compartment, rack or the like, that includes an electric storage 102, e.g. a battery bank, or the like. In FIGS. 1-2, storage 102 is made up of a plurality of batteries. Batteries 102 can be rechargeable batteries. The electrical system 101, e.g. an electric motor controller 121 and the storage 102, is electrically coupled to the electric motor 106 by way of a high voltage power bus 123. High voltage power bus 123 can be for 500 V or greater, e.g. a range from 890-1000 V, or higher. The high voltage power bus 123 is bi-directional, meaning power can go to electric-motor 106 from electric-motor controller 121 and from electric-motor 106 to electric-motor controller 121. The electric motor controller 121 is positioned between electric motor 106 and electric storage 102. It is contemplated that an electrical distribution system or battery management system can be positioned within the electric storage zone 103, or between storage compartment 103 and the electric-motor controller 121. The electrical distribution system and/or battery management system is configured for managing the electrical power from the power storage 102, e.g. the batteries 102, to the electric-motor 106. A separate conductor or bus 141 connects electric storage 102 to electric motor controller 121. Those skilled in the art will readily appreciate that electric storage zone 103 can be in a variety of suitable places throughout the aircraft.

As shown in FIG. 2, electrical storage system 110 includes electric storage compartment 103 (or zone) having a fluid inlet 114 and a fluid outlet 116. Electrical storage system 110 includes ventilation by way of a cooling fluid source 112 in fluid communication with the fluid inlet 114 via a fluid flow path 115 to manage temperature changes of electrical storage system 110 during discharge and recharge conditions. Cooling fluid source 112 can be a cooling air source that supplies a modulated flow rate of cooling air through electrical storage compartment 103 to carry away heat generated by resistive pathways within battery cells 102 and interconnects. Due to the modulated flow rate, high and low volume cooling fluid can dilute and displace any smoke or gas generated by a failing or failed battery cell, as would occur at the onset or during thermal runaway of affected cell. The modulated flow rate would adjust according to concentration changes of unwanted gas and smoke detected by smoke and gas detection system 120 until the smoke or gas has been either diluted to safe concentration levels or displaced beyond the fluid exit flow path 117. Thermal runaway of lithium ion batteries typically results from internal failures of the battery, or overcharging. Typically, safe operation of battery system can persist even with few cells having gone through thermal runaway.

With continued reference to FIG. 2, the cooling fluid source 112 is upstream from the fluid inlet 114. System 110 includes a modulating valve 118, or the like, in the fluid flow path 115 downstream from the cooling fluid source 112 and upstream from the fluid inlet 114 to modulate the airflow from cooling fluid source 112 to create a periodic detection window of low flow rate air. A high flow rate value is set by the system cooling requirements in that the high flow rate, e.g. between detection periods 302 described below, should be sufficient to remove heat generated within be battery by discharge and charging quickly enough to allow the battery temperature to recover to the required temperature at the start of a mission, which is set depending on a combination of battery performance, reliability, life, and safety considerations. The low flow rate, e.g. during detection periods 302 described below, would be function of the sensitivity of the detector, and the amount of gas produced early in the thermal runaway event, such that there is sufficient time for the system to react to the event. Electrical storage system 110 includes a fluid exit flow path 117 extending from the fluid outlet 116 and a detector 120 configured and adapted to sense at least one of smoke, gas, or other particulates. The detector 120 is included within a detector system 122 operatively connected to the modulating valve 118 to control fluid flow through the modulating valve 118. Modulating valve 118 can be a solenoid valve, motor controlled valve, or the like. The detector 120 is downstream from the fluid outlet 116 and is in fluid communication with fluid from fluid outlet 116 along flow path 117. It is also contemplated that the detector 120 can be within electric storage compartment (or zone) 103 and that multiple detectors can be used. The periodic detection window defined by a period of low flow rate air enables detector 120 to sense the gas or smoke. After the detection window, the modulating valve 118 is metered open to a greater level than during the detection widow to allow a higher flow rate air flow period that effectively cools the batteries 102. This allows for high flow rate battery cooling, which permits higher charge and discharge rates of the batteries, while still allowing failure detection and protection to be applied with the high flow rate cooling air via these detection windows/periods.

A method for operating an electrical storage system, e.g. electrical storage system 110, includes adjusting a modulating valve, e.g. modulating valve 118, in a fluid flow path, e.g. fluid flow path 115, to reduce a cooling airflow to a fluid inlet, e.g. fluid inlet 114, of an electric storage compartment/zone, e.g. electric storage compartment 103. The cooling airflow is being supplied from a cooling fluid source, e.g. cooling fluid source 112 such as a cooling air source, in fluid communication with the fluid inlet upstream from the fluid inlet along the fluid flow path. The reduction in cooling airflow that stems from the adjusting includes adjusting to the low flow rate that is described above. The method includes operating a detector, e.g. detector 120, configured and adapted to sense at least one of smoke, gas, or other particulates during a detection period with a detection system, e.g. detector system 122. The detector is in fluid communication with a fluid outlet, e.g. fluid outlet 116, of the electric storage compartment. A duration of the detection period is a predetermined duration based on an estimated detection time.

After the detection period, the method includes adjusting the modulating valve to increase the cooling airflow to the fluid inlet of the electric storage compartment, e.g. to the high flow rate that is described above. The adjusting between low (or zero) flow rates and high flow rates can be repeated until detection or other safety step is taken. In other words, after increasing the cooling airflow to the high flow rate, the modulating valve can then be metered closed or partially closed to reduce the airflow back to the low flow rate for the detection period. The detector can be on and sensing for the entire time (even during high flow rate periods), or can be turned on and off just for the detection periods. Adjusting the modulating valve includes adjusting the modulating valve with the detector system via a solenoid, or the like.

Figure 3:
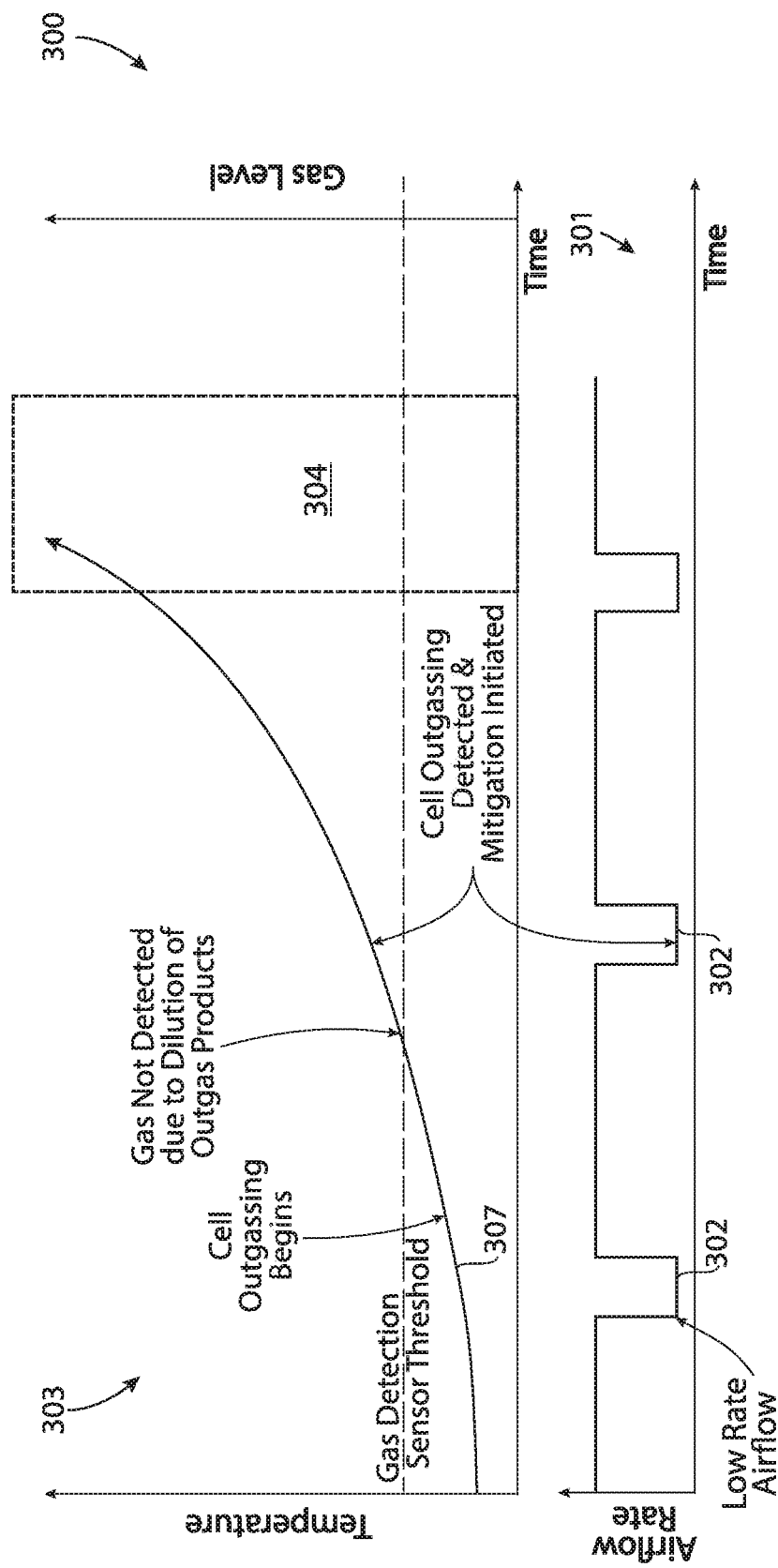
FIG. 3 is a graphical depiction of battery temperature and airflow rate over time in the electric storage compartment for the electrical storage system of FIG. 2.

As shown in FIG. 3, chart 300 schematically shows a thermal runaway scenario where two detection periods 302 are completed prior to thermal runaway 304. Chart 300 shows airflow rate versus time 301 and a combined chart 303 of battery temperature versus time, shown by curve 307, and gas level versus time. Due to high airflow rates between the two detection periods 302, outgassing of the battery cells may not be detected because gas level is kept below the gas detection sensor threshold by the high ventilation. The estimated detection period 302 and the time between the two periods 302 is set to ensure detection and allow the battery to be electrically disconnected prior to onset of thermal runaway 304. For example, if the time from initial gas release from an overheating battery is 10 minutes, a detection period could be set to 4 minutes. This ensures that two four-minute detection periods occur, prior to thermal runaway. The duration of the detection period 302 is also set based on how long it takes for gas/fluid to flow from the failing cell to the detector during a low-flow scenario.

The methods and systems of the present disclosure, as described above and shown in the drawings, provide for improved smoke, gas and other particulate detection in an energy storage compartment with high ventilation. While the systems and methods of the subject disclosure have been shown and described with reference to preferred embodiments, those skilled in the art will readily appreciate that changes and/or modifications may be made thereto without departing from the scope of the subject disclosure.

What is claimed is:

1. An electrical storage system, comprising:
   an electric storage zone;
   an electric storage positioned within the electric storage zone;
   a cooling air source in fluid communication with the electric storage zone via a fluid flow path, wherein the cooling air source is configured and adapted to dilute and displace any smoke or gas generated by a failing or failed electrical storage within the electric storage zone;
   a modulating valve in the fluid flow path downstream from the cooling fluid source and upstream from the electric storage zone, wherein the modulating valve is configured and adapted to selectively vary a flow area of the fluid flow path during a detection window; and
   a detector downstream from the electric storage zone along the fluid flow path in fluid communication with the electric storage zone and configured and adapted to sense at least one of smoke, gas, or other particulates generated by a failing or failed electrical storage in the fluid flow path during a detection window.

2. The system as recited in claim 1, wherein the electric storage zone has a fluid inlet and a fluid outlet.

3. The system as recited in claim 2, wherein the cooling air source is in fluid communication with the fluid inlet.

4. The system as recited in claim 2, wherein the detector is in fluid communication with the fluid outlet downstream from the fluid outlet.

5. The system as recited in claim 1, wherein the cooling air source is upstream from the electric storage zone.

6. The system as recited in claim 1, a fluid exit flow path extends from the electric storage zone.

7. The system as recited in claim 1, wherein the electric storage includes a plurality of batteries.

8. The system as recited in claim 1, wherein the electric storage is electrically coupled to an electric motor controller.

9. The system as recited in claim 8, wherein the electric motor controller is electrically coupled to an electric motor.

10. The system as recited in claim 1, wherein the detector is included within a detector system operatively connected to the modulating valve to control fluid flow through the modulating valve.

11. The system as recited in claim 1, further comprising a detection system operatively connected to the modulating valve to control fluid flow therethrough during the detection window based on an estimated detection time, wherein the detection system includes the detector.

* * * * *